(12) United States Patent
Jung et al.

(10) Patent No.: US 7,425,906 B2
(45) Date of Patent: Sep. 16, 2008

(54) METHOD OF CODE GENERATION, AND METHOD AND APPARATUS FOR CODE MODULATION

(75) Inventors: Kiu-Hae Jung, Suwon-si (KR); Joo-Ho Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/574,962

(22) PCT Filed: Sep. 1, 2005

(86) PCT No.: PCT/KR2005/002895

§ 371 (c)(1),
(2), (4) Date: Apr. 23, 2007

(87) PCT Pub. No.: WO2006/028336

PCT Pub. Date: Mar. 16, 2006

(65) Prior Publication Data

US 2008/0094261 A1    Apr. 24, 2008

(30) Foreign Application Priority Data

Sep. 8, 2004    (KR) ............... 10-2004-0071787

(51) Int. Cl.
*H03M 7/00*    (2006.01)
(52) U.S. Cl. .................. 341/59; 341/58; 341/65; 341/67; 341/68; 341/69
(58) Field of Classification Search ............. 341/58, 341/59, 65, 67, 106
See application file for complete search history.

(56) References Cited

U.S. PATENT DOCUMENTS

| | | | | |
|---|---|---|---|---|
| 5,220,568 A * | 6/1993 | Howe et al. | ............... | 714/782 |
| 6,172,622 B1 * | 1/2001 | Nakagawa et al. | ............ | 341/59 |
| 6,348,883 B2 * | 2/2002 | Okada et al. | ............. | 341/59 |
| 6,441,756 B1 | 8/2002 | Shim | | |
| 6,697,311 B1 | 2/2004 | Kim | | |
| 2002/0159366 A1 * | 10/2002 | Nobukuni et al. | ......... | 369/59.12 |
| 2004/0207545 A1 * | 10/2004 | Kayanuma et al. | ........... | 341/58 |
| 2005/0156760 A1 * | 7/2005 | Nakagawa et al. | ............ | 341/59 |
| 2005/0174267 A1 * | 8/2005 | Nakagawa et al. | ............ | 341/59 |
| 2006/0022847 A1 * | 2/2006 | Lee et al. | ................ | 341/50 |
| 2007/0127344 A1 * | 6/2007 | Mizuno et al. | ........... | 369/59.12 |
| 2007/0237060 A1 * | 10/2007 | Ohno et al. | ............. | 369/275.1 |

FOREIGN PATENT DOCUMENTS

JP    2004-220766    8/2004

* cited by examiner

*Primary Examiner*—Linh V Nguyen
(74) *Attorney, Agent, or Firm*—Stein, McEwen & Bui, LLP

(57) ABSTRACT

A method of generating codewords that conform to a run length limited (RLL) constraint represented by (d, k, a, b), where d is a minimum run length of a codeword, k is a maximum run length of the codeword, a is a length of source data, and b is a length of the codeword. The method includes generating codewords conforming to the RLL(d, k) constraint, and removing codewords in which a relatively long T and a relatively short T are placed adjacent to each other from the generated codewords.

14 Claims, 9 Drawing Sheets

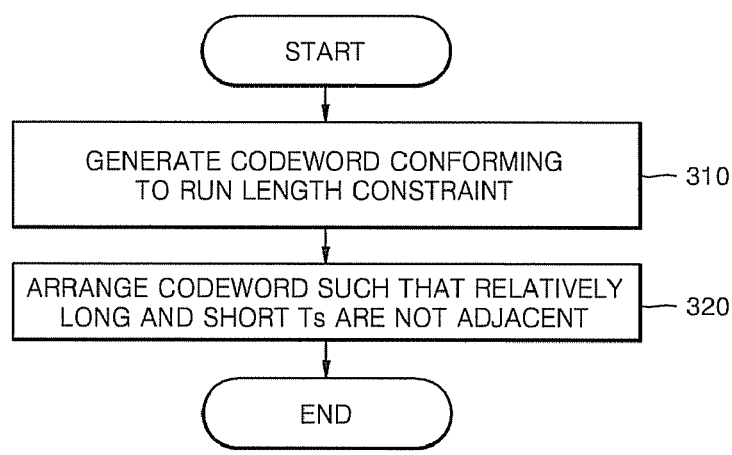
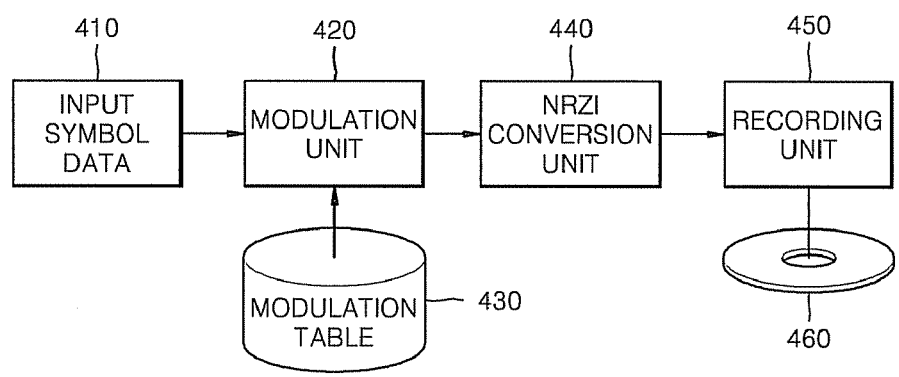

FIG. 6A

| Data Symbol | STATE 1 Code Word MSB LSB | NCG | STATE 2 Code Word MSB LSB | NCG | STATE 3 Code Word MSB LSB | NCG |
|---|---|---|---|---|---|---|
| 000 | 010100001010000 | 2 | 001010001001000 | 2 | 10000101000001 | 1 |
| 001 | 010100001001000 | 2 | 001010000100100 | 2 | 01000101000001 | 1 |
| 002 | 010010000101000 | 2 | 001010000010010 | 2 | 00100010100001 | 1 |
| 003 | 010100100001000 | 2 | 001001000101000 | 2 | 10010100101001 | 1 |
| 004 | 010000010001000 | 2 | 001001000010100 | 2 | 00100001010001 | 1 |
| 005 | 010101000101000 | 2 | 001001000001010 | 2 | 00100000101001 | 1 |
| 006 | 010010100101000 | 2 | 101010101010000 | 2 | 10101010101000 | 2 |
| 007 | 010101010000001 | 1 | 10100010100001 | 1 | 10101010100010 | 2 |
| 008 | 010010001001000 | 2 | 101010100101000 | 2 | 10101010010100 | 2 |
| 009 | 010010010000010 | 2 | 101010100001010 | 2 | 10101010001010 | 2 |
| 010 | 010010000100100 | 2 | 101010010100010 | 2 | 10101001010010 | 2 |
| 011 | 010010000010010 | 2 | 101010001010100 | 2 | 10101000101010 | 2 |
| 012 | 010001010001000 | 2 | 101010000001000 | 2 | 10101000001000 | 2 |
| 013 | 010001001010000 | 2 | 101001010101000 | 2 | 10100101010100 | 2 |
| 014 | 010001001000100 | 2 | 101001010010100 | 2 | 10100101001010 | 2 |
| 015 | 010001000010100 | 2 | 101001000100100 | 2 | 10100100000100 | 2 |
| 016 | 010001000001010 | 2 | 101000101010100 | 2 | 10100010101010 | 2 |
| 017 | 010000101000100 | 2 | 101000100010000 | 2 | 10100010001000 | 2 |
| 018 | 010000100100010 | 2 | 101000010000010 | 2 | 10100010000010 | 2 |
| 019 | 010000001010100 | 2 | 101000001000100 | 2 | 10100001000100 | 2 |
| 020 | 010000001001010 | 2 | 101000000100010 | 2 | 10100000100010 | 2 |
| 021 | 001010101010010 | 2 | 100101010100100 | 2 | 10010101010010 | 2 |
| 022 | 001010100001000 | 2 | 100101001010100 | 2 | 10010100101010 | 2 |
| 023 | 001010100000010 | 2 | 100101000010000 | 2 | 10010100001000 | 2 |
| 024 | 001010010000100 | 2 | 100100100001000 | 2 | 10010010000100 | 2 |
| 025 | 001010000100010 | 2 | 100100010010000 | 2 | 10010001001000 | 2 |
| 026 | 001001010100010 | 2 | 100100010001000 | 2 | 10010001000010 | 2 |
| 027 | 001001010000010 | 2 | 100100001000100 | 2 | 10010000100100 | 2 |
| 028 | 001001000100100 | 2 | 100100000010010 | 2 | 10010000010010 | 2 |
| 029 | 001001000010010 | 2 | 100010101010100 | 2 | 10001010101010 | 2 |
| 030 | 001000101010000 | 2 | 100010100010000 | 2 | 10001010001000 | 2 |
| 031 | 001000101000010 | 2 | 100010001000100 | 2 | 10001001000100 | 2 |
| 032 | 001000100101000 | 2 | 100010001001010 | 2 | 10001000101010 | 2 |
| 033 | 001000100001010 | 2 | 100010000100010 | 2 | 10001000100010 | 2 |
| 034 | 001000010100100 | 2 | 100010000010100 | 2 | 10001000010100 | 2 |
| 035 | 001000000101010 | 2 | 100010000001010 | 2 | 10001000001010 | 2 |
| 036 | 000101010001000 | 2 | 100001010010000 | 2 | 10000101001000 | 2 |
| 037 | 000101001000010 | 2 | 100001000100100 | 2 | 10000100100100 | 2 |
| 038 | 000100101001000 | 2 | 100001000100010 | 2 | 10000100010010 | 2 |
| 039 | 000100100100010 | 2 | 100000101001000 | 2 | 10000010101000 | 2 |
| 040 | 000100001010100 | 2 | 100000010010100 | 2 | 10000010010100 | 2 |
| 041 | 000100001001010 | 2 | 100000010001010 | 2 | 10000010001010 | 2 |
| 042 | 000010101000010 | 2 | 010101010101100 | 2 | 10000010100001 | 1 |
| 043 | 000010010010010 | 2 | 010101010010010 | 2 | 10001001000001 | 1 |
| 044 | 000010001010010 | 2 | 010101010001000 | 2 | 10000100100001 | 1 |
| 045 | 000010000010100 | 2 | 010100100101010 | 2 | 10000100010001 | 1 |
| 046 | 010101000100010 | 1 | 010100010010000 | 2 | 01000010100001 | 1 |
| 047 | 000001000000100 | 2 | 010100100000010 | 2 | 01000001010001 | 1 |
| 048 | 010010100000101 | 2 | 010100010001000 | 2 | 10101010100001 | 1 |
| 049 | 010101010100010 | 2 | 010100001000010 | 2 | 01000101000100 | 2 |
| 050 | 010101001010010 | 2 | 010010100001000 | 2 | 01000100101000 | 2 |
| 051 | 010101010001000 | 2 | 010010010001000 | 2 | 01000100100010 | 2 |
| 052 | 010010010000100 | 2 | 010010010000010 | 2 | 01000100010100 | 2 |
| 053 | 010100001000010 | 2 | 010001000100100 | 2 | 01000100001010 | 2 |
| 054 | 010010101010010 | 2 | 010010000010010 | 2 | 01000010100100 | 2 |
| 055 | 010010100001000 | 2 | 010001010001000 | 2 | 01000010010010 | 2 |
| 056 | 010010010010010 | 2 | 010001001010100 | 2 | 01000010100010 | 2 |
| 057 | 010010000100100 | 2 | 010001001001000 | 2 | 01000001010100 | 2 |
| 058 | 010001010001000 | 2 | 010000100101000 | 2 | 00100010101000 | 2 |
| 059 | 010001001000100 | 2 | 010001000001010 | 2 | 00100010100010 | 2 |
| 060 | 010000100001010 | 2 | 010000100101000 | 2 | 00100010010100 | 2 |

FIG. 6B

| Data Symbol | STATE 1 Code Word MSB → LSB | NCG | STATE 2 Code Word MSB → LSB | NCG | STATE 3 Code Word MSB → LSB | NCG |
|---|---|---|---|---|---|---|
| 061 | 01000010101000 | 2 | 01000010010010 | 2 | 00100010001010 | 2 |
| 062 | 01000010010100 | 2 | 01000001010100 | 2 | 00100001010010 | 2 |
| 063 | 01000010001010 | 2 | 01000001001010 | 2 | 00100000101010 | 2 |
| 064 | 00101010000100 | 2 | 00101010101010 | 2 | 10101010100100 | 2 |
| 065 | 00101001000010 | 2 | 00101010001000 | 2 | 10101010010010 | 2 |
| 066 | 00100101000100 | 2 | 00101010000010 | 2 | 10101001010100 | 2 |
| 067 | 00100100100010 | 2 | 00101001000100 | 2 | 10101001001010 | 2 |
| 068 | 00100010100100 | 2 | 00101000100010 | 2 | 10100101010010 | 2 |
| 069 | 00100010010010 | 2 | 00100101001010 | 2 | 10100100101010 | 2 |
| 070 | 00100001010100 | 2 | 00100101000010 | 2 | 10100100001000 | 2 |
| 071 | 00100001001010 | 2 | 00100100100100 | 2 | 10100010000100 | 2 |
| 072 | 00010101000010 | 2 | 00100100010010 | 2 | 10100001000010 | 2 |
| 073 | 00010010100010 | 2 | 00100010101000 | 2 | 10010101010100 | 2 |
| 074 | 00010001010010 | 2 | 00100010100010 | 2 | 10010101001010 | 2 |
| 075 | 00010000101010 | 2 | 00100010010100 | 2 | 10010010101010 | 2 |
| 076 | 01000101010001 | 1 | 00100010001010 | 2 | 10010001001000 | 2 |
| 077 | 00001000010001 | 1 | 00100001010010 | 2 | 10010001000100 | 2 |
| 078 | 00101010100001 | 1 | 00100000101010 | 2 | 10010000100010 | 2 |
| 079 | 01010010101000 | 2 | 10101010100100 | 2 | 10001001001000 | 2 |
| 080 | 00010100101000 | 2 | 10101010010010 | 2 | 10001000100100 | 2 |
| 081 | 01010101001000 | 2 | 10101001010100 | 2 | 10001000010010 | 2 |
| 082 | 01010010101000 | 2 | 10101001001010 | 2 | 10000100101000 | 2 |
| 083 | 00100100101000 | 2 | 10100101010010 | 2 | 10000100101010 | 2 |
| 084 | 00000100001000 | 2 | 10100100101010 | 2 | 10000100010010 | 2 |
| 085 | 01010100010010 | 2 | 10100100001000 | 2 | 01000101001000 | 2 |
| 086 | 00001000100000 | 3 | 10100010000100 | 2 | 01000100100100 | 2 |
| 087 | 00000100010000 | 3 | 10100001000010 | 2 | 01000100010010 | 2 |
| 088 | 00100100001010 | 2 | 10010101010100 | 2 | 01000010101000 | 2 |
| 089 | 00010010101000 | 2 | 10010101001010 | 2 | 01000010010100 | 2 |
| 090 | 01000101000001 | 1 | 10010010101010 | 2 | 01000010001010 | 2 |
| 091 | 01000010100001 | 1 | 10010010001000 | 2 | 00100010100100 | 2 |
| 092 | 01000001010001 | 1 | 10010001000100 | 2 | 00100010010010 | 2 |
| 093 | 01001001000001 | 1 | 10010000100010 | 2 | 00100001010100 | 2 |
| 094 | 00010000100000 | 3 | 10001001001000 | 2 | 00100001001010 | 2 |
| 095 | 00001000010000 | 3 | 10001000100100 | 2 | 10100101000001 | 1 |
| 096 | 01010100010000 | 3 | 10001000010010 | 2 | 10100010100001 | 1 |
| 097 | 00101010101001 | 1 | 10000100101000 | 2 | 10010100010010 | 2 |
| 098 | 00001000100001 | 1 | 10000100010100 | 2 | 10010010101000 | 2 |
| 099 | 00001000101001 | 1 | 10000100001010 | 2 | 10010010010100 | 2 |
| 100 | 00100000100000 | 3 | 01010101010010 | 2 | 10010010001010 | 2 |
| 101 | 00010000010000 | 3 | 01010100101010 | 2 | 10001010100100 | 2 |
| 102 | 01010000010100 | 2 | 01010100001000 | 2 | 10001010010010 | 2 |
| 103 | 00010100000101 | 1 | 01010010000100 | 2 | 10001001010100 | 2 |
| 104 | 00001010000101 | 1 | 01010001000010 | 2 | 10001001001010 | 2 |
| 105 | 00000101000101 | 1 | 01001010101010 | 2 | 10000101010010 | 2 |
| 106 | 00001010010100 | 2 | 01001010001000 | 2 | 10000100101010 | 2 |
| 107 | 01001001010001 | 1 | 01001001000100 | 2 | 10000100001000 | 2 |
| 108 | 00100100000101 | 1 | 01001000100010 | 2 | 10000010000100 | 2 |
| 109 | 00010010000101 | 1 | 01000101001000 | 2 | 10000001000010 | 2 |
| 110 | 00001001001001 | 1 | 01000100100100 | 2 | 01000101010100 | 2 |
| 111 | 00000100100101 | 1 | 01000100010010 | 2 | 01000100101010 | 2 |
| 112 | 00101000010100 | 2 | 01000010101000 | 2 | 01000010101010 | 2 |
| 113 | 01010101000101 | 1 | 01000010010100 | 2 | 01000010001000 | 2 |
| 114 | 01010100010101 | 1 | 01000010001010 | 2 | 01000001000100 | 2 |
| 115 | 01000100100001 | 1 | 00101010000100 | 2 | 01000000100010 | 2 |
| 116 | 01000010010001 | 1 | 00101001000010 | 2 | 00100001001000 | 2 |
| 117 | 00100101000001 | 1 | 00100101000100 | 2 | 00100000100100 | 2 |
| 118 | 00100001010001 | 1 | 00100100010010 | 2 | 10100101010100 | 2 |
| 119 | 01010001000001 | 1 | 00100010100100 | 2 | 10101010001000 | 2 |
| 120 | 01010000010001 | 1 | 00100010010010 | 2 | 10101010000010 | 2 |
| 121 | 01001000100001 | 1 | 00100001010100 | 2 | 10101001000100 | 2 |

FIG. 6C

| Data Symbol | STATE 1 Code Word MSB LSB | NCG | STATE 2 Code Word MSB LSB | NCG | STATE 3 Code Word MSB LSB | NCG |
|---|---|---|---|---|---|---|
| 122 | 01000100010001 | 1 | 00100001001010 | 2 | 10101000100010 | 2 |
| 123 | 00100100100001 | 1 | 10100101000001 | 1 | 10100101001000 | 2 |
| 124 | 00100010010001 | 1 | 10101001000001 | 1 | 10100101000010 | 2 |
| 125 | 00010101000001 | 1 | 01000101000001 | 1 | 10100100100100 | 2 |
| 126 | 00010010100001 | 1 | 01010000010010 | 2 | 10100100010010 | 2 |
| 127 | 00010100010001 | 1 | 10000101001010 | 2 | 10100010101000 | 2 |
| 128 | 00010001010001 | 1 | 10010100010010 | 2 | 10100010100010 | 2 |
| 129 | 01001001010100 | 2 | 10010010101000 | 2 | 10100010010100 | 2 |
| 130 | 01001001001010 | 2 | 10010010010100 | 2 | 10100010001010 | 2 |
| 131 | 01000101010010 | 2 | 10010100001010 | 2 | 10100001010010 | 2 |
| 132 | 01000100101010 | 2 | 10001010100100 | 2 | 10100000101010 | 2 |
| 133 | 01000100001000 | 2 | 10001010010010 | 2 | 10010101000100 | 2 |
| 134 | 00010010001001 | 1 | 10001001010100 | 2 | 10010100100010 | 2 |
| 135 | 01000010000100 | 2 | 10001001001010 | 2 | 10010010100100 | 2 |
| 136 | 01000001000010 | 2 | 10000101010010 | 2 | 10010010010010 | 2 |
| 137 | 00101010101000 | 2 | 10000100101010 | 2 | 10010001010100 | 2 |
| 138 | 00101010100010 | 2 | 10000100001000 | 2 | 10010001001010 | 2 |
| 139 | 00101010010100 | 2 | 10000010000100 | 2 | 10001010100010 | 2 |
| 140 | 00101010001010 | 2 | 00100010100001 | 1 | 10001001010010 | 2 |
| 141 | 00101001010010 | 2 | 01010100101000 | 2 | 10001000101010 | 2 |
| 142 | 00101000101010 | 2 | 01010100010100 | 2 | 10001000001000 | 2 |
| 143 | 00101000001000 | 2 | 01010100001010 | 2 | 10000101010001 | 1 |
| 144 | 00100101010100 | 2 | 01001010101000 | 2 | 10000100000100 | 2 |
| 145 | 00100101001010 | 2 | 01001010010100 | 2 | 10000010000010 | 2 |
| 146 | 00100100000100 | 2 | 01001010001010 | 2 | 01000101010010 | 2 |
| 147 | 00100010101010 | 2 | 01000101010100 | 2 | 01000100101010 | 2 |
| 148 | 00100010001000 | 2 | 01000101001010 | 2 | 01000100001000 | 2 |
| 149 | 00100010000010 | 2 | 01000010101010 | 2 | 01000101010001 | 1 |
| 150 | 00100001000100 | 2 | 01000010001000 | 2 | 01000010000100 | 2 |
| 151 | 00100000100010 | 2 | 01000001000100 | 2 | 01000001000010 | 2 |
| 152 | 00010101010010 | 2 | 00100101000001 | 1 | 00100010101010 | 2 |
| 153 | 00010100101010 | 2 | 00100001001000 | 2 | 00100010001000 | 2 |
| 154 | 00010100001000 | 2 | 00100000100100 | 2 | 00100010000010 | 2 |
| 155 | 00010010000100 | 2 | 10101010101010 | 2 | 00100001000100 | 2 |
| 156 | 00010001001000 | 2 | 10101010001000 | 2 | 00100000100010 | 2 |
| 157 | 00010001000010 | 2 | 10101010000010 | 2 | 10101010000100 | 2 |
| 158 | 00010000100100 | 2 | 10101001000100 | 2 | 10101001000010 | 2 |
| 159 | 00010000010010 | 2 | 10101000100010 | 2 | 10100101000100 | 2 |
| 160 | 00001010101010 | 2 | 10101000101000 | 2 | 10100100100010 | 2 |
| 161 | 00001010001000 | 2 | 10100101000010 | 2 | 10100010100100 | 2 |
| 162 | 00001001000100 | 2 | 10100100100100 | 2 | 10100010010010 | 2 |
| 163 | 00001000101000 | 2 | 10100100010010 | 2 | 10100001010100 | 2 |
| 164 | 00001000100010 | 2 | 10100010101000 | 2 | 10100001001010 | 2 |
| 165 | 00001000010100 | 2 | 10100010100010 | 2 | 10010101000010 | 2 |
| 166 | 00001000001010 | 2 | 10100010010100 | 2 | 10010010100010 | 2 |
| 167 | 00000101001000 | 2 | 10100010001010 | 2 | 10010001010010 | 2 |
| 168 | 00000100100100 | 2 | 10100001010010 | 2 | 10010000101010 | 2 |
| 169 | 00000100010010 | 2 | 10100000101010 | 2 | 10010010010001 | 1 |
| 170 | 00100000100001 | 1 | 10010101000100 | 2 | 01000100000100 | 2 |
| 171 | 00001010001010 | 2 | 10010100100010 | 2 | 01000010000010 | 2 |
| 172 | 00000100010001 | 1 | 10010010100100 | 2 | 00100010000100 | 2 |
| 173 | 01010101000100 | 2 | 10010010010010 | 2 | 00100001000010 | 2 |
| 174 | 01010100100010 | 2 | 10010001010100 | 2 | 10100100010001 | 1 |
| 175 | 01010010100100 | 2 | 10010001001010 | 2 | 10001010010001 | 1 |
| 176 | 01010010010010 | 2 | 10001010100010 | 2 | 10001000101001 | 1 |
| 177 | 01010001010100 | 2 | 10001001010010 | 2 | 01000001000001 | 1 |
| 178 | 01010001001010 | 2 | 10001000101010 | 2 | 10101001010001 | 1 |
| 179 | 01001010100010 | 2 | 10001000001000 | 2 | 10101000101001 | 1 |
| 180 | 01001001010010 | 2 | 10010000010100 | 2 | 10100010001001 | 1 |
| 181 | 01001000101010 | 2 | 10000100000100 | 2 | 10010101010001 | 1 |
| 182 | 01001000001000 | 2 | 10000010000010 | 2 | 10010001000001 | 1 |

FIG. 6D

| Data Symbol | STATE 1 Code Word MSB LSB | NCG | STATE 2 Code Word MSB LSB | NCG | STATE 3 Code Word MSB LSB | NCG |
|---|---|---|---|---|---|---|
| 183 | 01000100000100 | 2 | 01010101001000 | 2 | 10001010101001 | 1 |
| 184 | 01000010000010 | 2 | 01010101000010 | 2 | 10001000100001 | 1 |
| 185 | 00101010100100 | 2 | 01010100100100 | 2 | 10000100010001 | 1 |
| 186 | 00101010010010 | 2 | 01010100010010 | 2 | 10000010001001 | 1 |
| 187 | 00101001010100 | 2 | 01010010101000 | 2 | 01000100100001 | 1 |
| 188 | 00101001001010 | 2 | 01010010100010 | 2 | 01000010010001 | 1 |
| 189 | 00100101010010 | 2 | 01010010010100 | 2 | 01000001001001 | 1 |
| 190 | 00100100101010 | 2 | 01010010001010 | 2 | 10101010010001 | 1 |
| 191 | 00100100001000 | 2 | 01010001010010 | 2 | 10101001001001 | 1 |
| 192 | 00100010000100 | 2 | 01010000101010 | 2 | 10100101010001 | 1 |
| 193 | 00100001000010 | 2 | 01001010100100 | 2 | 10100100101001 | 1 |
| 194 | 00010101010100 | 2 | 01001010010010 | 2 | 10100001000001 | 1 |
| 195 | 00010101001010 | 2 | 01001001010100 | 2 | 10010101001001 | 1 |
| 196 | 00010010101010 | 2 | 01001001001010 | 2 | 10010010101001 | 1 |
| 197 | 00010010001000 | 2 | 01000101010010 | 2 | 10010001000001 | 1 |
| 198 | 00010001000100 | 2 | 01000100101010 | 2 | 10001000010001 | 1 |
| 199 | 00010000100010 | 2 | 01000100001000 | 2 | 10000100001001 | 1 |
| 200 | 00001001001000 | 2 | 01000101000010 | 2 | 01000100010001 | 1 |
| 201 | 00001000100100 | 2 | 01000010000100 | 2 | 01000010001001 | 1 |
| 202 | 00001001010001 | 1 | 01000001000010 | 2 | 00100010010001 | 1 |
| 203 | 00001010010001 | 1 | 00101010101000 | 2 | 00100001001001 | 1 |
| 204 | 00000101010001 | 1 | 00101010100010 | 2 | 10101010001001 | 1 |
| 205 | 00101000010010 | 2 | 00101010010100 | 2 | 10100101001001 | 1 |
| 206 | 01010000100001 | 1 | 00101010001010 | 2 | 10100010101001 | 1 |
| 207 | 01001000010001 | 1 | 00101001010010 | 2 | 10100000100001 | 1 |
| 208 | 00101000100001 | 1 | 00101000101010 | 2 | 10010000010001 | 1 |
| 209 | 01001000100000 | 3 | 00101000001000 | 2 | 10001000001001 | 1 |
| 210 | 01000100010000 | 3 | 00100101010100 | 2 | 01000001001000 | 2 |
| 211 | 00100100010001 | 1 | 00100101001010 | 2 | 00100010001000 | 2 |
| 212 | 01000010100010 | 2 | 00100100100100 | 2 | 10101001001000 | 2 |
| 213 | 00101001001000 | 2 | 00100010101010 | 2 | 10101000100100 | 2 |
| 214 | 00101000100100 | 2 | 00100010001000 | 2 | 10101000010010 | 2 |
| 215 | 01010000100000 | 3 | 00100010000010 | 2 | 10100100101000 | 2 |
| 216 | 01001000010000 | 3 | 00100001000100 | 2 | 10100100010100 | 2 |
| 217 | 00101000100000 | 3 | 00100000100010 | 2 | 10100100001010 | 2 |
| 218 | 00100100010000 | 3 | 10101010000100 | 2 | 10010101001000 | 2 |
| 219 | 01010000100100 | 2 | 10101001000010 | 2 | 10010100100100 | 2 |
| 220 | 01001000010100 | 2 | 10100101000100 | 2 | 01000100001001 | 1 |
| 221 | 00000101010100 | 2 | 10100100100010 | 2 | 10100000101000 | 2 |
| 222 | 00001010100001 | 1 | 10100010100100 | 2 | 10001010000010 | 2 |
| 223 | 01010000010000 | 3 | 10100010010010 | 2 | 10000101000010 | 2 |
| 224 | 00101000010000 | 3 | 10100001010100 | 2 | 10000010100010 | 2 |
| 225 | 00010100010000 | 3 | 10100001001010 | 2 | 10101000101000 | 2 |
| 226 | 00010010010001 | 1 | 10010101000010 | 2 | 10101000010100 | 2 |
| 227 | 00010100100001 | 1 | 10010010100010 | 2 | 10101000001010 | 2 |
| 228 | 01010100000101 | 1 | 10010001010010 | 2 | 10010100101000 | 2 |
| 229 | 01010000010101 | 1 | 10010000101010 | 2 | 10010100010100 | 2 |
| 230 | 01001010000101 | 1 | 10001010000100 | 2 | 10010100001010 | 2 |
| 231 | 01000101000101 | 1 | 01010101000100 | 2 | 10001010101000 | 2 |
| 232 | 01000010100101 | 1 | 01010101000100 | 2 | 10001010010100 | 2 |
| 233 | 01000001010101 | 1 | 01010010100100 | 2 | 10001010001010 | 2 |
| 234 | 00101000100101 | 1 | 01010010010010 | 2 | 10000101010100 | 2 |
| 235 | 00010100010101 | 1 | 01010001010100 | 2 | 10000101001010 | 2 |
| 236 | 00001010010101 | 1 | 01010001001010 | 2 | 10000010101010 | 2 |
| 237 | 00000101010101 | 1 | 01001010100010 | 2 | 10000010001000 | 2 |
| 238 | 00001001000001 | 1 | 01001001010010 | 2 | 10000001000100 | 2 |
| 239 | 01010010000101 | 1 | 01001000101010 | 2 | 10000000100010 | 2 |
| 240 | 01010000100101 | 1 | 01001000001000 | 2 | 10100001001000 | 2 |
| 241 | 01001001000101 | 1 | 01000100000100 | 2 | 10100000100100 | 2 |
| 242 | 01001000010101 | 1 | 01000010000010 | 2 | 10010100000100 | 2 |
| 243 | 01000100100101 | 1 | 00101010100100 | 2 | 10010010000010 | 2 |

FIG. 6E

| Data Symbol | STATE 1 Code Word MSB          LSB | NCG | STATE 2 Code Word MSB          LSB | NCG | STATE 3 Code Word MSB          LSB | NCG |
|---|---|---|---|---|---|---|
| 244 | 01000010010101 | 1 | 00101010010010 | 2 | 10010000101000 | 2 |
| 245 | 00101010000101 | 1 | 00101001010100 | 2 | 10010000010100 | 2 |
| 246 | 00101000100101 | 1 | 00101001001010 | 2 | 10001010000100 | 2 |
| 247 | 00100101000101 | 1 | 00100101010010 | 2 | 10001001000010 | 2 |
| 248 | 00100100010101 | 1 | 00100100101010 | 2 | 10000101000100 | 2 |
| 249 | 00100010100101 | 1 | 00100100001000 | 2 | 10000100100010 | 2 |
| 250 | 00100001010101 | 1 | 00100010000100 | 2 | 10000010100100 | 2 |
| 251 | 00010100100101 | 1 | 00100001000010 | 2 | 10000010010010 | 2 |
| 252 | 00010010010101 | 1 | 10000100100010 | 2 | 01000101000010 | 2 |
| 253 | 00001010100101 | 1 | 10000100100010 | 2 | 01000010100010 | 2 |
| 254 | 00001001010101 | 1 | 10001001000010 | 2 | 01000001010010 | 2 |
| 255 | 01010001000101 | 1 | 01000010100010 | 2 | 10001001010001 | 1 |

METHOD OF CODE GENERATION, AND METHOD AND APPARATUS FOR CODE MODULATION

CROSS-REFERENCE TO RELATED APPLICATIONS

This application claims the benefit of PCT International Patent Application No. PCT/KR2005/002895, filed Sep. 1, 2005, and Korean Application No. 2004-71787, filed Sep. 8, 2004, in the Korean Intellectual Property Office, the disclosures of which are incorporated herein by reference.

BACKGROUND OF THE INVENTION

1. Field of the Invention

Aspects of the present invention relate to data modulation, and, more particularly, to a method of code generation and a method and apparatus to allow for code modulation.

2. Description of the Related Art

Run length limited (RLL) codes are some of the most commonly used modulated codes in a data recording system, such as an optical disc drive system. RLL codes limit the run length of a code stream. Here, the term 'run' refers to the number of consecutive zeros between ones in a code stream. The RLL codes are defined according to a constraint, RLL(d, k), where d is the minimum number of zeros between ones and k is the maximum number of zeros between ones in a code stream. The value of k is restricted such that at least one transition occurs at intervals of k+1 bits in a modulated non-return-to-zero inverted (NRZI) waveform, allowing the system to recover a timing signal within a time of k+1 bits.

In addition to referring to the minimum number of zeros between ones, the value of d also refers to a minimum time interval between consecutive transitions in the NRZI waveform that is determined to avoid inter-symbol interference (ISI). Further, it is noted that RLL(2, 10) and RLL(1, 7) constraints are widely used in modern optical discs. However, as the bit density on a disc increases, the length of marks recorded on the disc decreases to the point where recording and reproducing data with existing RLL constraint codes may become problematic.

FIGS. 1A and 1B show analog signals detected from a disc on which 8T, 2T, 4T, and 6T waveform segments of RLL(1, 7) codes are recorded.

FIG. 1A shows analog signals detected from a disc on which 8T, 2T, 4T, and 6T waveform segments are recorded within a relatively long mark. As shown in FIG. 1A, even though a relatively long segment (8T) is recorded next to a relatively short segment (2T), since the mark is relatively long, the signal may be well detected.

FIG. 1B shows analog signals detected from a disc on which 8T, 2T, 4T, and 6T waveform segments are recorded within a relatively short mark. As shown in FIG. 1B, the 8T, 2T, 4T, and 6T waveform segments are recorded on the disc in the same order as in FIG. 1A. However, since the mark is relatively short and a short segment (2T) is recorded next to a long segment (8T) within the short mark, the short segment (2T) may not be detected clearly.

The reason for this is that when a recording process is performed on a high density medium, such as a super-resolution near-filed structure (super-RENS) medium, a large amount of energy is applied to record a relatively long waveform segment. The large amount of energy heats the recording medium and affects subsequent recording processes. In particular, when a relatively short waveform segment is recorded immediately following a longer segment within a short mark, the heating of the medium during the recording of the longer segment reduces the clarity and distinction with which the following shorter segment is recorded. Consequently, when a mark is as small as is allowed, recording relatively short segments adjacent to relatively long segments often results in poor detection of the short segment.

SUMMARY OF THE INVENTION

Aspects of the present invention provide a method of code generation, and a method and an apparatus to allow for code modulation in which a performance of detecting data recorded as RLL codes on a disc is improved even when marks are short while conforming to RLL(d, k) constraints.

According to an aspect of the present invention, reproduction performance of codewords recorded on a recording medium is improved, even if a mark length is short, by the arrangement of code segments such that relatively long Ts and relatively short Ts are not placed adjacent to each other in each codeword. Aspects of the present invention are also applicable to a system using data divided into user data and parity data by an application of the code arrangement method to at least part of the user data or at least part of the parity data to increase the reliability of important data.

According to an aspect of the present invention, there is provided a method of generating codewords conforming to a run length limited (RLL) constraint represented by (d, k, a, b), where d is a minimum run length of a codeword, k is a maximum run length of the codeword, a is a length of source data, and b is a length of the codeword. The method comprises generating codewords conforming to the RLL(d, k) constraint; and removing codewords in which a relatively long T and a relatively short T are placed adjacent to each other from the generated codewords.

According to an aspect of the present invention, the relatively short T, denoted nT, and the relatively long T, denoted mT, are selected as follows:

when k−d is an odd number, n is selected from among d+1, d+2, . . . , d+(k−d+1)/2, and m is selected from among (k+1)−(k−d+1)2+1, . . . , k+1, and when k−d is an even number, n is selected from among d+1, d+2, . . . , d+(k−d)/2, and m is selected from among (k+1)−(k−d)2+1, . . . , (k+1)−1, k+1.

According to an aspect of the present invention, removing codewords is performed by removing codewords in which at least one of 2T and 7T, 2T and 8T, 3T and 7T, and 3T and 8T are placed adjacent to each other, when d=1, and k=7.

According to another aspect of the present invention, there is provided an apparatus to modulate 'a' bits of source data to 'b' bits of a codeword conforming to run length constraint ranging from a minimum run length 'd' to a maximum run length 'k', the apparatus comprising: a modulation unit that modulates the source data into the codeword by arranging the codeword such that a relatively long T and a relatively short T are not placed adjacent to each other in the codeword.

According to an aspect of the present invention, the relatively short T, denoted nT, and the relatively long T, denoted mT, are selected as follows:

when k−d is an odd number, n is selected from among d+1, d+2, . . . , d+(k−d+1)/2, and m is selected from among (k+1)−(k−d+1)2+1, . . . , k+1, and when k−d is an even number, n is selected from among d+1, d+2, . . . , d+(k−d)/2, and m is selected from among (k+1)−(k−d)2+1, . . . , (k+1)−1, k+1.

According to an aspect of the present invention, if d=1 and k=7, the relatively short T and the relatively long T correspond to at least one pair selected from (2T 7T), (2T 8T), (3T 7T), and (3T 8T).

According to still another invention, there is provided a method of modulating 'a' bits of source data to 'b' bits of a codeword conforming to run length constraint ranging from a minimum run length 'd' to a maximum run length 'k', the method comprising: modulating the source data into the codeword by arranging the codeword such that a relatively long T and a relatively short T are not placed adjacent to each other in the codeword.

According to an aspect of the present invention, the relatively short T denoted nT and the relatively long T denoted mT, are selected as follows:

when k−d is an odd number, n is selected from among d+1, d+2, . . . , d+(k−d+1)/2, and m is selected from among (k+1)−(k−d+1)2+1, . . . , k+1, and when k−d is an even number, n is selected from among d+1, d+2, . . . , d+(k−d)/2, and m is selected from among (k+1)−(k−d)2+1, . . . , (k+1)−1, k+1.

According to an aspect of the present invention, if d=1 and k=7, the relatively short T and the relatively long T correspond to at least one pair selected from (2T, 7T), (2T, 8T), (3T, 7T), and (3T, 8T).

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a flowchart illustrating a method of code arrangement according to an embodiment of the present invention;

FIG. 4 is a block diagram of an exemplary apparatus for code modulation according to an embodiment of the present invention;

FIGS. 6A through 6E are exemplary code conversion tables according to an embodiment of the present invention;

DETAILED DESCRIPTION OF THE EMBODIMENTS

Figure 1A:
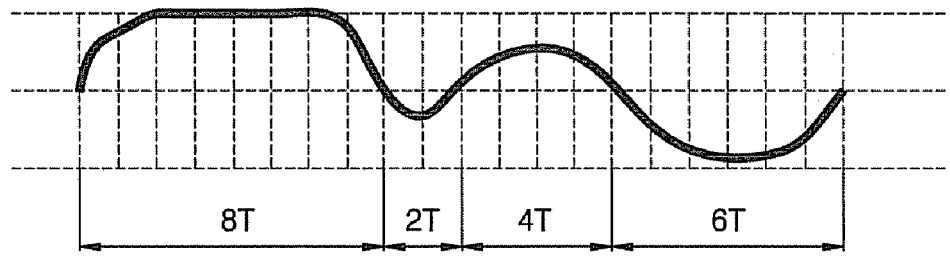
FIG. 1A shows a conventional long mark having waveform sections of lengths 8T, 2T 4T, and 6T.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
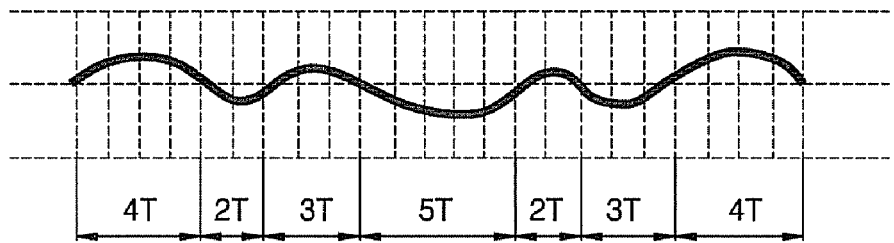
FIG. 2 shows waveform sections to aid in explaining code arrangement that improves reproduction even when the codes are recorded in a short mark, according to an embodiment of the present invention.

FIG. 2 shows waveform sections to aid in explaining a code arrangement that improves reproduction even when the codes are recorded in a short mark, according to an embodiment of the present invention.

Figure 1B:
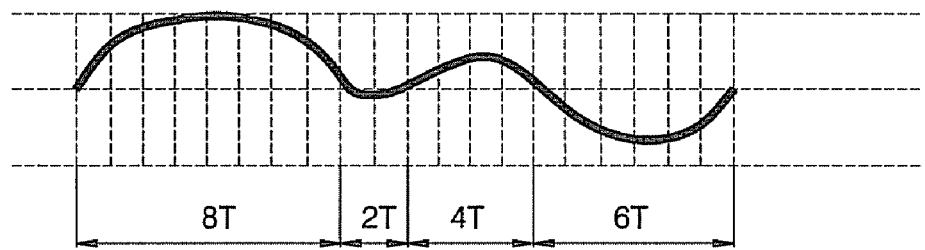
FIG. 1B shows a conventional short mark having waveform sections of lengths of 8T, 2T, 4T, and 6T.

As shown in FIG. 2, relatively short RLL(1, 7) code sections of lengths 4T, 2T, 3T, 5T, 2T, 3T, and 4T, which are recorded in a short mark as shown in FIG. 1B, are recovered as an analog signal. In this case, the detection rate (reproduction performance) for the various 2T sections shown in FIG. 2 is higher than that of FIG. 1B, since the 2T sections of FIG. 2 are recorded adjacent to waveform sections that are not very much longer (3T, 4T and 5T sections).

Accordingly, aspects of the present invention improve a code detection rate when code segments are recorded in short marks by arranging code segments such that relatively short Ts and relatively long Ts are not placed adjacent to each other, while conforming to conventional run length constraints.

FIG. 3 is a flowchart illustrating a method of a code arrangement according to aspects of the present invention.

First, in operation 310, code generation is performed that satisfies a certain run length constraint. For example, in performing code modulation where source data of 8 bits is to be converted into a codeword of 14 bits, the number of possible combinations of codewords with 0's and 1's is 214. Here, if the RLL(1, 7) constraint is given, codewords having 1-7 zeros between ones are selected from the 214 codewords.

Next, in operation 320, codewords selected in operation 310 are arranged such that relatively long Ts and relatively short Ts are not placed adjacent to each other. To this end, lengths of relatively long Ts, denoted by mT, and relatively short Ts, denoted by nT, can be determined according to rules (1) and (2) as follows:

(1) when k−d is an odd number, n is selected to be at least one of d+1, d+2, . . . , d+(k−d+1)/2, and m is selected to be at least one of (k+1)−(k−d+1)/2+1, . . . , (k+1)−1, k+1, and (2) when k−d is an even number, n is selected to be at least one of d+1, d+2, . . . , d+(k−d)/2, and m is selected to be at least one of (k+1)−(k−d)/2+1, . . . (k+1)−1, k+1.

Accordingly, specific examples of a pair of nT and mT are determined. For example, if k=7 and d=1, since k−d=6, an even number, the pair (nT, mT) is determined according to rule (2). In other words, n is selected to be at least one of 2, 3, and 4, and m is selected to be at least one of 6, 7, and 8, according to rule (2). Thus, the pair may be (2T, 6T), (2T 7T), (2T, 8T) (3T, 6T), (3T, 7T), (3T, 8T), (4T, 6T), (4T, 7T), or (4T 8T).

As such, code arrangement is performed to exclude codewords in which relatively long Ts and relatively short Ts corresponding to at least one of the pairs are placed adjacent to each other. It should be appreciated that various other methods of determining the long and short T's may also be applied within the scope of the present invention. In addition, the extent to which the length of the relatively long T or relatively short T may be determined depends on the system to which the invention is applied.

It will also be understood by those skilled in the art that codewords are further arranged to maintain a good DC balance of code streams for source data, and to conform to certain constraints on the minimum run lengths that run between codewords (RMTR).

FIGS. 6A through 6E are exemplary code conversion tables according to an embodiment of the present invention. As shown in FIGS. 6A through 6E, the code conversion tables includes codewords that are modulated according to RLL(1, 7) and are arranged such that 2T and 7T, 2T and 8T, 3T and 7T, and 3T and 8T are not placed adjacent to each other in each codeword. The code conversion tables are comprised of 3 states which each include a next code group (NCG) to indicate a next code to be modulated.

FIG. 4 is an example of a code modulation apparatus according to an embodiment of the present invention. As shown in FIG. 4, the apparatus includes a modulation unit 420, a modulation table 430, an NRZI conversion unit 440, and a recording unit 450. The modulation unit 420 receives input symbol data 410 and converts the received input symbol data into a codeword by referring to the modulation table 430. The modulation table 430 includes codewords that are arranged according to an embodiment of the present invention such that relatively long Ts and relatively short Ts are not placed adjacent to each other in each codeword, as shown in the tables of FIGS. 6A through 6E. The NRZI conversion unit 440 NRZI-converts the codeword received from the modulation unit 420 and provides the NRZI-converted result to the recording unit 450. The recording unit 450 records the NRZI converted codeword received from the NRZI conversion unit 440 onto a disc 460 or any other suitable recording medium.

Figure 5:
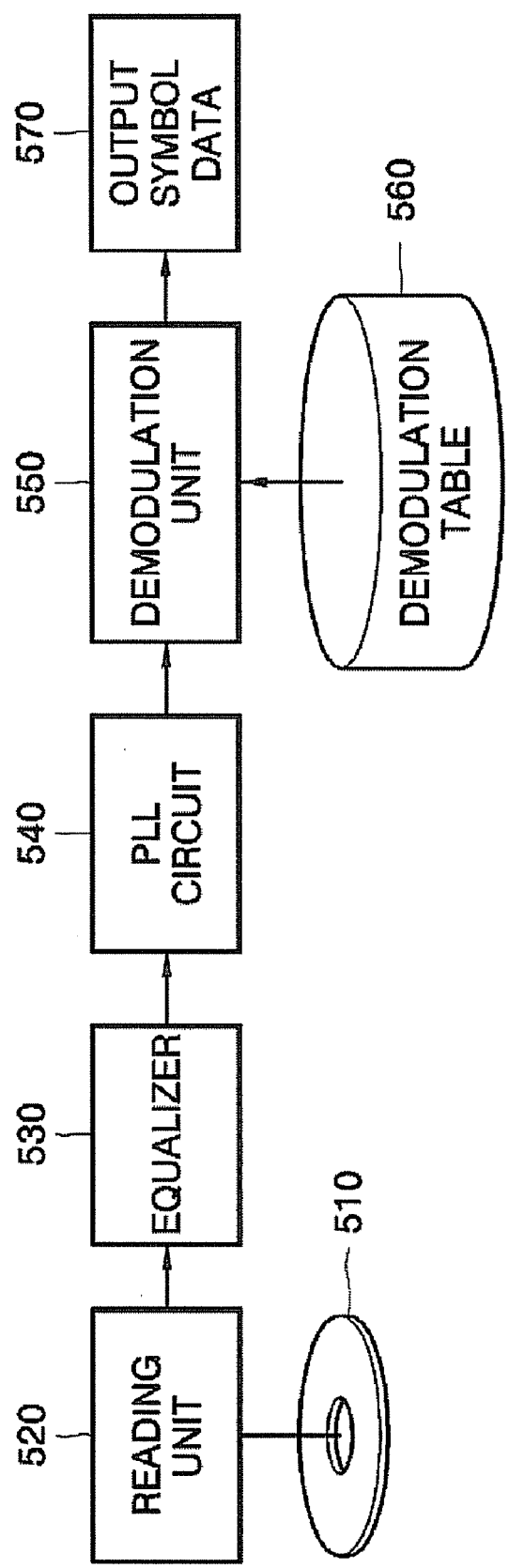
FIG. 5 is a block diagram of n exemplary apparatus for code demodulation according to an embodiment of the present invention.

FIG. 5 is an example of a code demodulation apparatus according to an embodiment of the present invention. As shown in FIG. 5, the apparatus includes a reading unit 520, an equalizer 530, a phase locked loop (PLL) circuit 540, a demodulation unit 550, and a demodulation table 560. The reading unit 520 reads a codeword from a disc 510 and provides the read codeword to the equalizer 530. The equalizer 530 equalizes the codeword received from the reading unit 520, and provides the equalized result to the PLL circuit 540. The PLL circuit 540 provides the codeword received from the equalizer 540 to the demodulation unit 550. The demodulation unit 550 demodulates the codeword received from the PLL circuit 540 by referring to the demodulation table 560. The demodulation table 560 is identical to the modulation table 430 having codewords arranged such that relatively long Ts and relatively short Ts are not placed adjacent to each other.

Figure 7A:
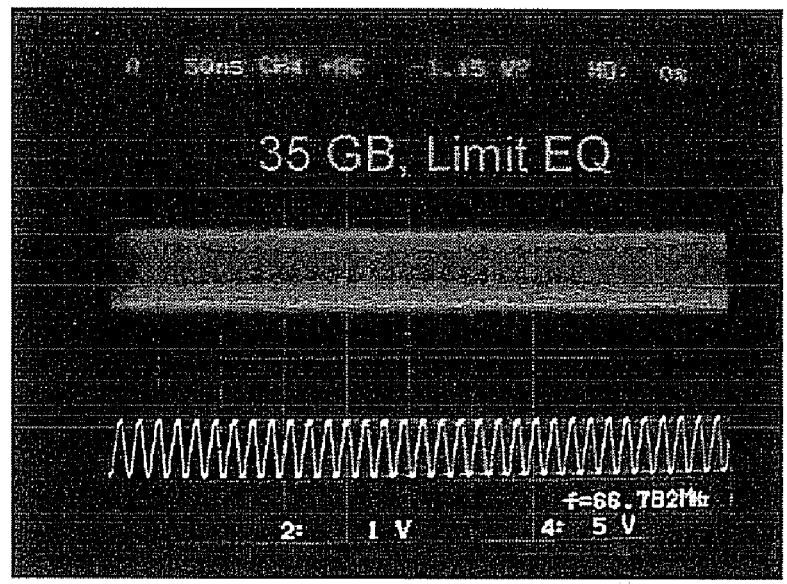
FIG. 7A is a photograph of the screen of an oscilloscope showing code reproduction performance in PLL operation with RLL(1, 7) codes without adjacent run length constraint.
Figure 7B:
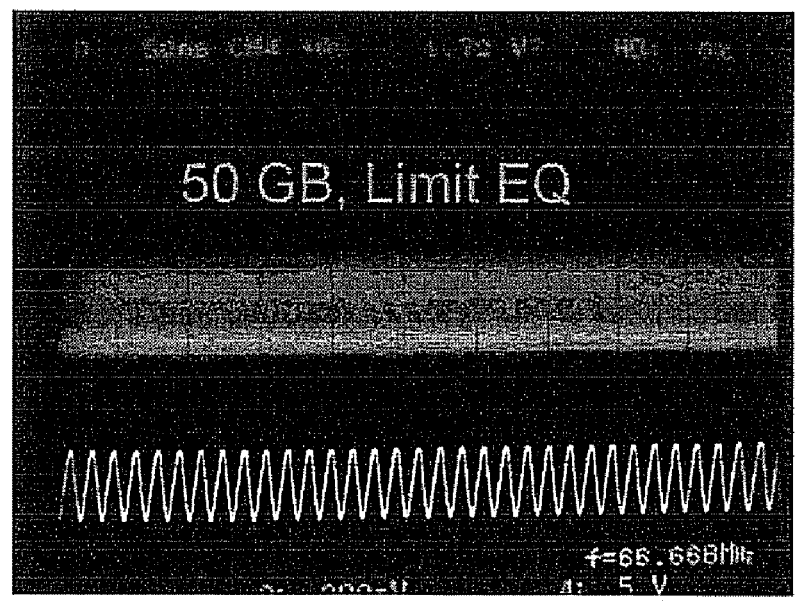
FIG. 7B is a photograph of the screen of an oscilloscope showing code reproduction performance in PLL operation with RLL(1, 7) codes with adjacent run length constraint according to the present invention.

FIG. 7A shows code reproduction performance in phase locked loop (PLL) operation with RLL(1, 7) codes without an adjacent run length constraint, and FIG. 7B shows code reproduction performance in PLL operation with RLL(1, 7) codes with an adjacent run length constraint, according to an embodiment of the present invention. The code reproduction performance for codes with and without adjacent run length constraint may be judged based on whether the PLL circuit operates.

As shown in FIG. 7A, general RLL(1, 7) codes without any adjacent run length constraint cause the PLL circuit to operate as long as the minimum length of the mark is at least 107 nm. Meanwhile, as shown in FIG. 7B, codes arranged according to an embodiment of the present invention such that 2T and 7T, 2T and 8T, 3T and 7T, and 3T and 8T are not placed adjacent to each other in each codeword cause the PLL circuit to operate as long as the minimum length of the mark is at least 75 nm.

It is possible for the method of code generation and code modulation described above according to an aspect of the present invention to be implemented as a computer program. Codes and code segments constituting the computer program may readily be inferred by those skilled in the art. The computer programs may be recorded on computer-readable media and read and executed by computers. Such computer-readable media include all kinds of storage devices, such as ROM, RAM, CD-ROM, magnetic tape, floppy disc, optical data storage devices, etc. The computer readable media also include everything that is realized in the form of carrier waves, e.g., transmission over the Internet. The computer-readable media may be distributed to computer systems connected to a network, and codes on the distributed computer-readable media may be stored and executed in a decentralized fashion.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A method of generating codewords that conform to a run length limited (RLL) constraint represented by (d, k, a, b), where d is a minimum run length of a codeword, k is a maximum run length of the codeword, a is a length of source data, and b is a length of the codeword, the method comprising:

generating codewords conforming to the RLL(d, k) constraint; and removing codewords in which a relatively long waveform segment T and a relatively short T are placed adjacent to each other from the generated codewords.

2. The method according to claim 1, wherein the relatively short T, denoted nT, and the relatively long T, denoted mT, are selected as follows:

when k−d is an odd number, n is selected from among d+1, d+2, . . . , d+(k−d+1)/2, and m is selected from among (k+1)−(k−d+1)2+1, . . . , k+1, and when k−d is an even number, n is selected from among d+1, d+2, . . . , d+(k−d)/2, and m is selected from among (k+1)−(k−d)2+1, . . . , (k+1)−1, k+1.

3. The method according to claim 1, wherein the removing of codewords is performed by removing codewords in which at least one of 2T and 7T, 2T and 8T, 3T and 7T, and 3T and 8T are placed adjacent to each other, when d=1, and k=7.

4. An apparatus to modulate 'a' bits of source data to 'b' bits of a codeword that conforms to a run length constraint ranging from a minimum run length 'd' to a maximum run length 'k', comprising a modulation unit that modulates the source data into the codeword by arranging the codeword such that a relatively long waveform segment T and a relatively short T are not placed adjacent to each other in the codeword.

5. The apparatus according to claim 4, wherein the relatively short T, denoted nT, and the relatively long T, denoted mT, are selected as follows:

when k−d is an odd number, n is selected from among d+1, d+2, . . . , d+(k−d+1)/2, and m is selected from among (k+1)−(k−d+1)2+1, . . . , k+1, and when k−d is an even number, n is selected from among d+1, d+2, . . . , d+(k−d)/2, and m is selected from among (k+1)−(k−d)2+1, . . . , (k+1)−1, k+1.

6. The apparatus according to claim 4, wherein, if d=1 and k=7, the relatively short T and the relatively long T correspond to at least one pair selected from (2T, 7T), (2T, 8T), (3T, 7T), and (3T, 8T).

7. A method of modulating 'a' bits of source data to 'b' bits of a codeword that conforms to a run length constraint ranging from a minimum run length 'd' to a maximum run length 'k', the method comprising modulating the source data into the codeword by arranging the codeword such that a relatively long waveform segment T and a relatively short T are not placed adjacent to each other in the codeword.

8. The method according to claim 7, wherein the relatively short T, denoted nT, and the relatively long T, denoted mT, are selected as follows:

when k−d is an odd number, n is selected from among d+1, d+2, . . . , d+(k−d+1)/2, and m is selected from among (k+1)−(k−d+1)2+1, . . . , k+1, and when k−d is an even number, n is selected from among d+1, d+2, . . . , d+(k−d)/2, and m is selected from among (k+1)−(k−d)2+1, . . . , (k+1)−1, k+1.

9. The method according to claim 7, wherein, if d=1 and k=7, the relatively short T and the relatively long T correspond to at least one pair selected from (2T, 7T), (2T, 8T), (3T, 7T), and (3T, 8T).

10. A method of generating codewords that conform to a run length limited (RLL) constraint represented by (d, k, a, b), where d is a minimum run length of a codeword, k is a maximum run length of the codeword, a is a length of source data, and b is a length of the codeword, the method comprising generating codewords conforming to the RLL(d, k) constraint in which a relatively long waveform segment T and a relatively short T are not adjacent to each other.

11. The method according to claim 10, wherein the relatively short T, denoted nT, and the relatively long T, denoted mT, are selected as follows:

when k−d is an odd number, n is selected from among d+1, d+2, . . . , d+(k−d+1)/2, and m is selected from among (k+1)−(k−d+1)2+1, . . . , k+1, and when k−d is an even number, n is selected from among d+1, d+2, . . . , d+(k−d)/2, and m is selected from among (k+1)−(k−d)2+1, . . . , (k+1)−1, k+1.

12. A code demodulation apparatus comprising:
a reading unit to read a codeword from a disc;
a demodulation table including codewords in which relatively long waveform segments Ts and relatively short Ts are not adjacent to each other; and
a demodulation unit to demodulate the codeword by referring to the demodulation table.

13. The code demodulation apparatus according to claim 12, further comprising an equalizer to equalize the codeword.

14. The code demodulation apparatus according to claim 12, further comprising a phase locked loop (PLL) circuit to provide the codeword to the demodulation unit.

* * * * *